United States Patent [19]
Trackwell et al.

[11] Patent Number: 5,516,119
[45] Date of Patent: May 14, 1996

[54] VAPOR CONTAINMENT AND RECIRCULATION DEVICE

[75] Inventors: Fred Trackwell, Houston; Joe King, Seabrook, both of Tex.

[73] Assignee: Environmental Seals & Services, Inc., Seabrook, Tex.

[21] Appl. No.: 193,256

[22] Filed: Feb. 8, 1994

[51] Int. Cl.⁶ .................................................... F16J 15/00
[52] U.S. Cl. .............................. 277/3; 277/15; 277/17; 277/72 R
[58] Field of Search ................... 277/3, 15, 17, 277/72 R, 135

[56] References Cited

U.S. PATENT DOCUMENTS

| | | | |
|---|---|---|---|
| Re. 34,923 | 5/1995 | Ruesch | 277/17 X |
| 3,514,167 | 5/1970 | Wahl, Jr. | 277/15 X |
| 3,532,444 | 10/1970 | Strub | 277/15 X |
| 3,670,850 | 6/1972 | Swearingen | 277/15 X |
| 3,887,197 | 6/1975 | Kapich et al. | 277/15 |
| 4,087,097 | 5/1978 | Bossens et al. | 277/3 |
| 4,245,844 | 1/1981 | Pohl et al. | 277/3 |
| 4,500,093 | 2/1985 | Kapich | 277/15 |
| 4,502,693 | 3/1985 | Lesiecki et al. | 277/17 X |
| 4,586,830 | 5/1986 | Carter | 277/3 X |
| 5,203,370 | 4/1993 | Block et al. | 277/17 X |

OTHER PUBLICATIONS

Penberthy, "Jet Pump Technical Data Pumping Gases", Section 1000, Bulletin 1300, Sep. 1987.
Penberthy, "Jet Pump Technical Data Heating Liquids", Section 1000, Bulletin 1400, Jun. 1987.
Penberthy, "Jet Pump Technical Data Mixing Liquids" Section 1000, Bulletin 1401, Sep. 1987.
Dura Metallic Corporation, "The PSS Dura Seal", 1990.
Dura Metallic Corporation, "The SL-Series Dura Seal", 1990.
Dura Metallic Corporation, "The RO Dura Seal", 1988.
Dura Metallic Corporation, "The HSC Dura Seal", 1991.
Dura Metallic Corporation, "The HSI Dura Seal", 1986.
Dura Metallic Corporation, "The HSS Dura Seal for High Speed Services", 1985.
Dura Metallic Corporation, "The MSS Dura Seal", 1988.

*Primary Examiner*—William A. Cuchlinski, Jr.
*Assistant Examiner*—John L. Beres
*Attorney, Agent, or Firm*—Rosenblatt & Redano

[57] ABSTRACT

This invention involves an apparatus for vapor containment and recirculation for use in fluid systems, including pumps and valves. More specifically, this invention provides a closed loop recirculation system for ensuring that vapor does not escape from fluid systems. The invention comprises a vapor containment gland comprising a vapor channel; a suction manifold attached to the vapor containment gland and comprising a suction channel, a fluid injection channel, and a suction nozzle bore; a suction nozzle insertable in said suction nozzle bore and comprising a flow channel in fluid communication with said fluid injection channel and said suction channel; and a fluid injection recirculation line attachable to said suction nozzle.

26 Claims, 3 Drawing Sheets

VAPOR CONTAINMENT AND RECIRCULATION DEVICE

BACKGROUND OF THE INVENTION

1. Field of the Invention

This invention involves an apparatus for vapor containment and recirculation for use in fluid systems, including pumps and valves. More specifically, this invention provides a closed loop recirculation system for ensuring that vapor does not escape from fluid systems.

2. Description of the Prior Art

Fluid systems and their components, such as pumps and valves, comprise mechanically moving parts. In order for such parts to move with respect to each other, there must be some degree of clearance between them. This clearance provides a flowpath for fluid to escape.

Prior art devices have employed mechanical seals, such as O-rings, to prevent fluid from leaking out of such fluid systems. Mechanical seals are subject to deterioration as a result of mechanical forces and corrosive substances that come into contact with the seals. The exposure of mechanical seals to certain corrosive elements may also weaken the seals' resistance to mechanical forces. For example, polymer-based O-rings may become brittle upon exposure to certain chemicals, thereby increasing the probability that such O-rings will crack or snap in response to mechanical stresses.

Prior art devices have employed both single and double mechanical seals to contain the fluid within a fluid system. Single mechanical seals have comprised a gland, a stationary face or seat, and a rotating face. In one embodiment of the single mechanical seal, all of these elements are contained in a one piece cartridge comprising a sleeve. Such seals leak process fluid across the stationary face and the rotating face in order to lubricate and cool the seal. Such leakage is environmentally unacceptable.

Other prior art devices employ double mechanical seals. Double mechanical seals comprise a barrier fluid at a pressure greater than the fluid pressure of the fluid system. The barrier fluid is circulated within a closed vent system. Double mechanical seals in existence today often involve both high maintenance costs and short life spans.

Fluid systems in common use often contain hazardous, toxic, and/or volatile organic compounds (VOCs). Federal and state environmental laws and regulations are becoming increasingly strict with regard to the release of such substances into the environment. For instance, the Clean Air Act of 1990, enacted by the United States Congress, sets increasingly stricter limits upon the release of selected VOCs through the remainder of this century.

The present invention is directed toward overcoming these problems of prior art vapor containment devices. Specifically, the present invention is directed toward providing a vapor containment system that does not leak VOCs and that has low maintenance costs and a long life span.

SUMMARY OF THE INVENTION

The present invention provides a vapor containment device for use in fluid systems. The present invention comprises a vapor containment gland attached to a suction manifold comprising a suction nozzle and a fluid injection recirculation line extending between the suction nozzle and a fluid injection channel extending into the suction manifold.

The vapor containment gland comprises a front face, a rear face, a vapor inlet, a vapor outlet, and a vapor channel connecting the vapor inlet to the vapor outlet. The suction manifold is attached to the vapor containment gland by mechanical means well known in the art, such as bolts or latches. The suction manifold comprises a suction channel in fluid communication with the vapor outlet, a fluid injection channel comprising a first end attachable to a fluid container and a second end intersecting the suction channel, and a suction nozzle bore in alignment with the suction channel. The suction nozzle bore extends to the outer periphery of the manifold.

The suction nozzle comprises a suction end, a discharge end, and a flow channel extending longitudinally through the suction nozzle. The nozzle is adjustably insertable in the bore to extend into the intersection of the suction channel and the fluid injection channel such that the flow channel of the suction nozzle is in fluid communication with the suction channel and the fluid injection channel.

The fluid injection recirculation line comprises a first end attached to the discharge end of the suction nozzle and a second end attached to the first end of the fluid injection channel. In this embodiment of the present invention, vapor can flow from the vapor inlet, through the vapor channel, out the vapor outlet, through the suction channel, into the suction nozzle, out of the suction nozzle, into the fluid injection recirculation line and back into the fluid injection channel, thereby flowing in a closed vent system.

In another embodiment of the present invention, a pressurized fluid delivery system comprising a container of pressurized fluid is also connected to the first end of the fluid injection channel of the suction manifold via a discharge line comprising a valve. The valve is operable such that it can be opened and closed to control the flow of pressurized fluid from the container of pressurized fluid into the fluid injection channel. In this embodiment, a liquid collection tank is installed in the fluid injection recirculation line for the purpose of collecting liquid that may flow through the fluid injection recirculation line. A filter is also installed in the fluid injection recirculation line downstream from the liquid collection tank and an exhaust gas collection tank is installed in the fluid injection recirculation line downstream from the filter.

When fluid is injected from the pressurized fluid container into the fluid injection channel, the pressurized fluid flows into the suction end of the suction nozzle creating a low pressure region at the intersection of the suction channel and the fluid injection channel. The pressurized fluid continues to flow through the flow channel and out the discharge end of the suction nozzle. The low pressure region created at the suction end of the suction nozzle creates a suction in the suction channel that is capable of sucking vapor out of the vapor containment gland through the vapor channel and the vapor outlet.

DETAILED DESCRIPTION OF THE PREFERRED EMBODIMENTS

Figure 1:
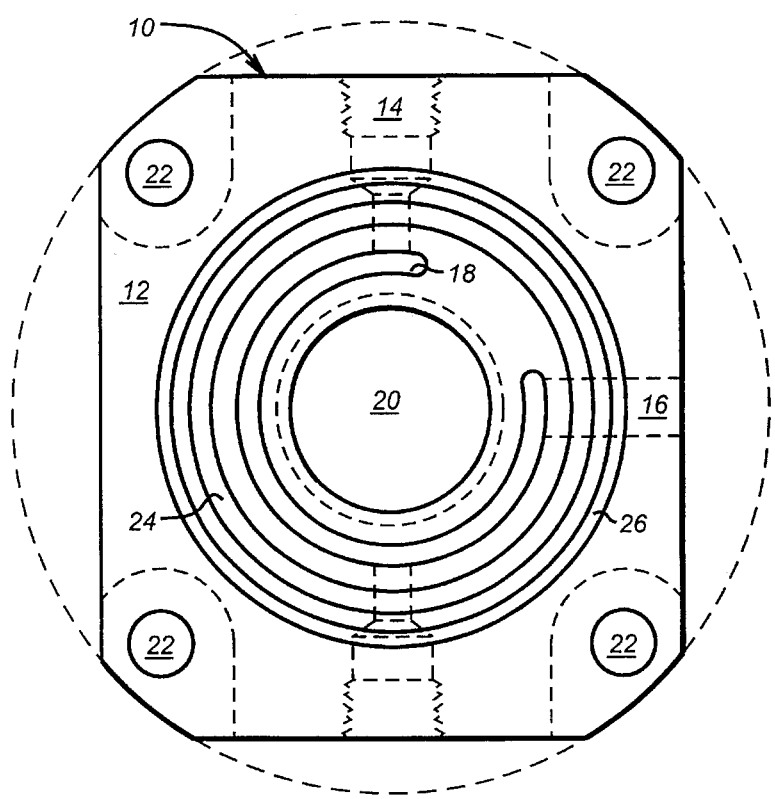
FIG. 1 is a front view of the vapor containment gland of the present invention.
Figure 2:
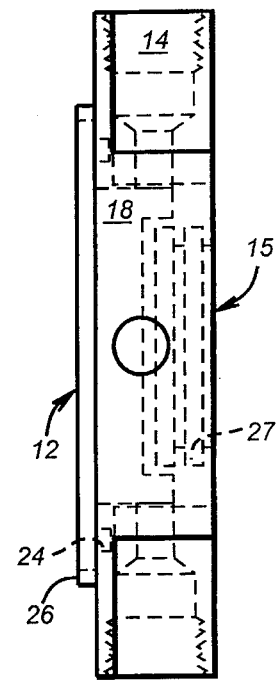
FIG. 2 is a side view of the vapor containment gland of the present invention.
Figure 3:
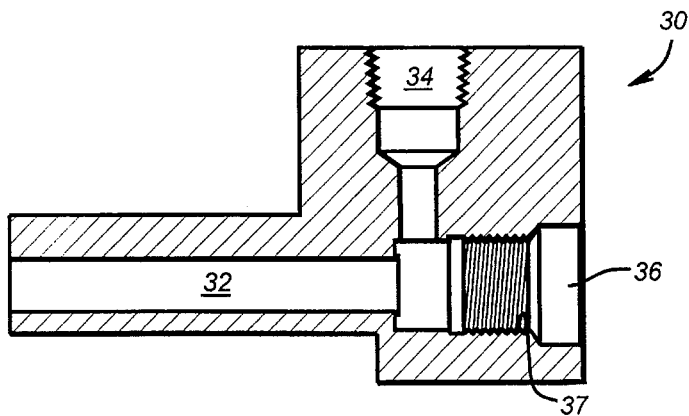
FIG. 3 is a cross-sectional view of the suction manifold of the present invention.
Figure 6:
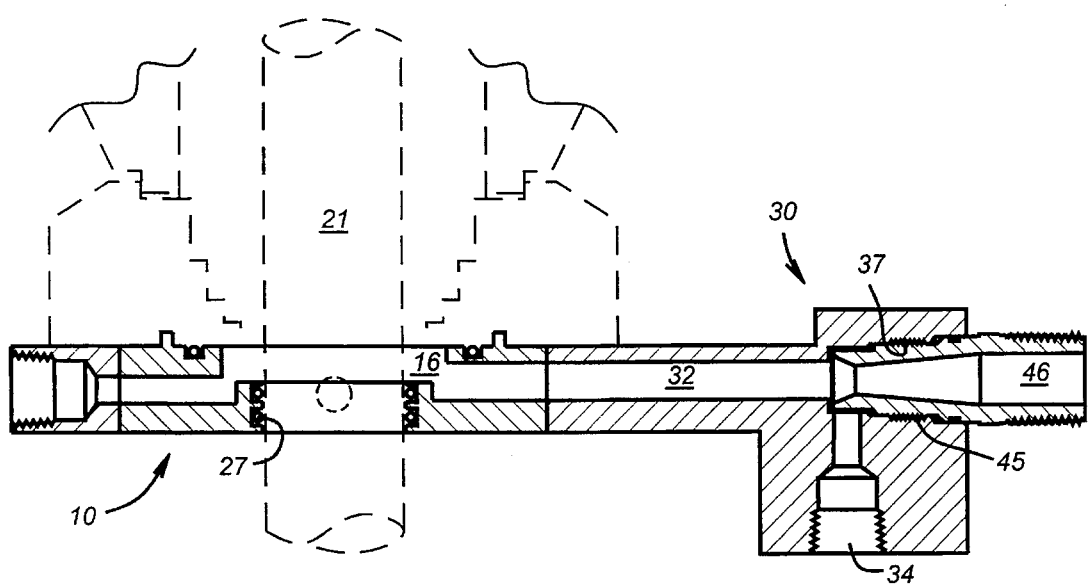
FIG. 6 is a cross-sectional top view of one embodiment of the present invention used in conjunction with a pump.
Figure 7A:
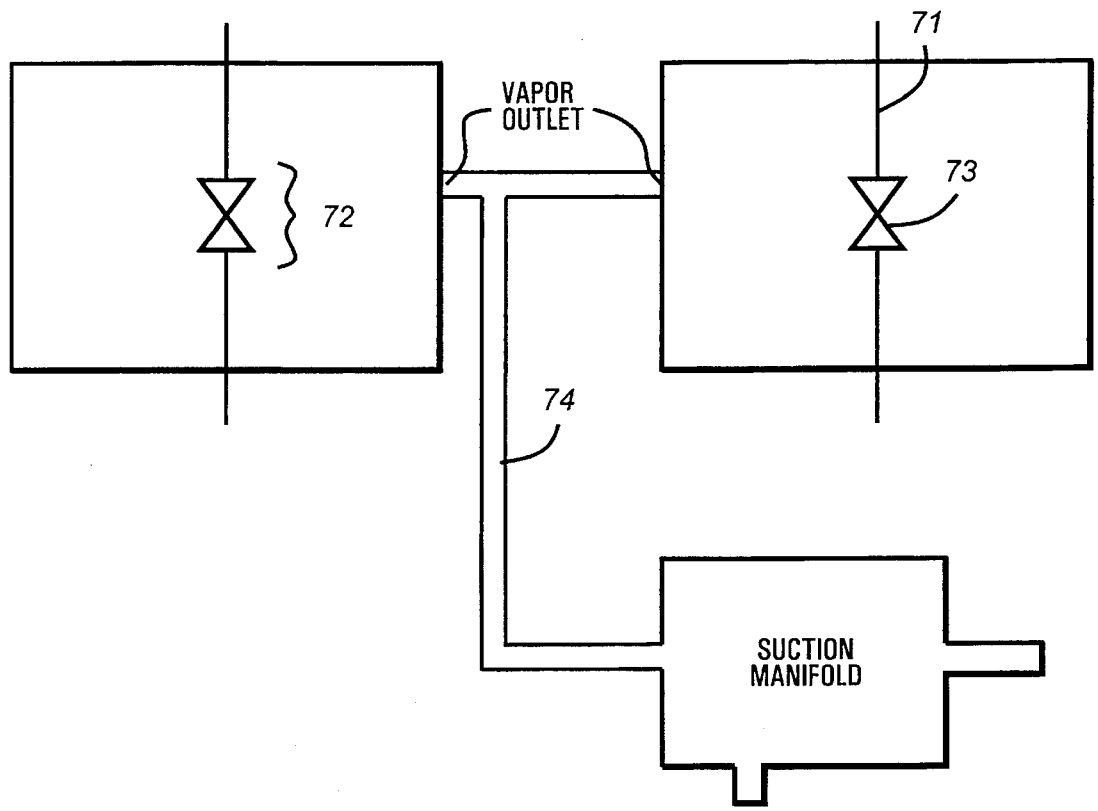
FIG. 7A is a top sectional view of another embodiment of the present invention used in conjunction with a valve.
Figure 7B:
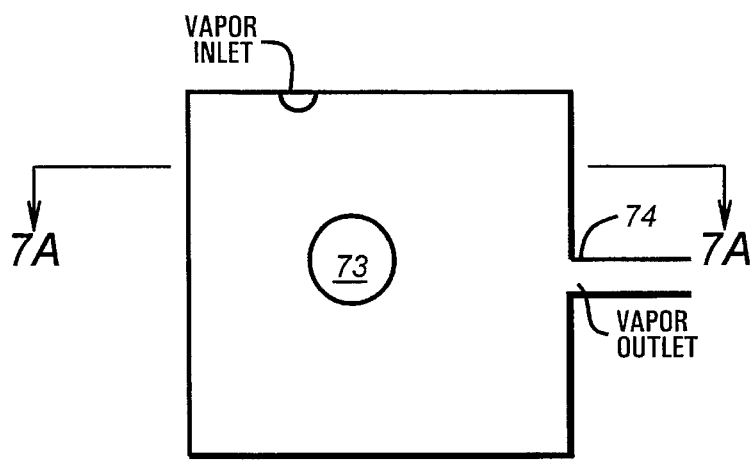
FIG. 7B is a front view of the embodiment of the invention shown in FIG. 7A.

In one embodiment, the present invention is a vapor containment device for use in fluid systems. The vapor containment device of the present invention comprises a vapor containment gland 10 comprising a front face 12, a rear face 15, a vapor inlet 14, a vapor outlet 16, and a vapor channel 18 extending in an arced configuration in the front face and connecting the vapor inlet and the vapor outlet, as shown in FIGS. 1 and 2. As shown in FIGS. 1 and 2, fluid must flow along an arced or circular path in order to travel from vapor inlet 14 to vapor outlet 16, through arced vapor channel 18. In a preferred embodiment intended for use with pumps, the vapor containment gland further comprises a cylindrical central bore 20 extending from the front face to the rear face and capable of receiving a pump shaft 21, as shown in FIGS. 1 and 6.

In another embodiment of the present invention intended for use with pumps, a cylindrical pump shaft comprising a sealing member 27 mounted on the shaft extends through the central bore of the vapor containment gland. The sealing member is mounted on the shaft and positioned such that it is in contact with the rear face of the vapor containment gland, as shown in FIG. 6. In one embodiment, the sealing member comprises an O-ring and lip seal of the type sold under the trademark PolyPak™ by Parker Seal Group of Lexington, Ky. The design of the sealing member will depend upon the characteristics of the system where the invention is installed, such as fluid chemistry, temperature and pressure differential across the sealing member. In another embodiment, the invention comprises two sealing members mounted on the pump shaft and positioned about either side of the vapor inlet. In this embodiment, a pressurization channel extends from the fluid injection channel into the vapor containment gland such that the volume between the two sealing members can be pressurized whenever pressurized fluid is injected into the fluid injection channel 34.

In a preferred embodiment, the vapor channel extends in an arced configuration around the central bore. In the most preferred embodiment, the arc of the vapor channel is greater than 270° and less than 360°, as shown in FIG. 1. It is desirable to have an arced configuration of less than 360° so that the entire length of the arced configuration will be subject to the suction produced by the suction manifold. In the preferred embodiment, a circular groove 24 lies in the front face surrounding the arced configuration of the vapor channel. This circular groove is capable of receiving an O-ring.

The vapor containment gland is intended for mechanical attachment to a fluid system. In a preferred embodiment, the vapor containment gland comprises at least one, and preferably two or more, bolt channels 22 extending from the front face to the rear face of the vapor containment gland near its outer periphery, as shown in FIG. 1. In the most preferred embodiment, the vapor containment gland further comprises a raised circular ridge 26 in the front face surrounding the circular groove. This raised ridge or pilot is used to position the vapor containment gland on the fluid system component to which it is attached.

Figure 5:
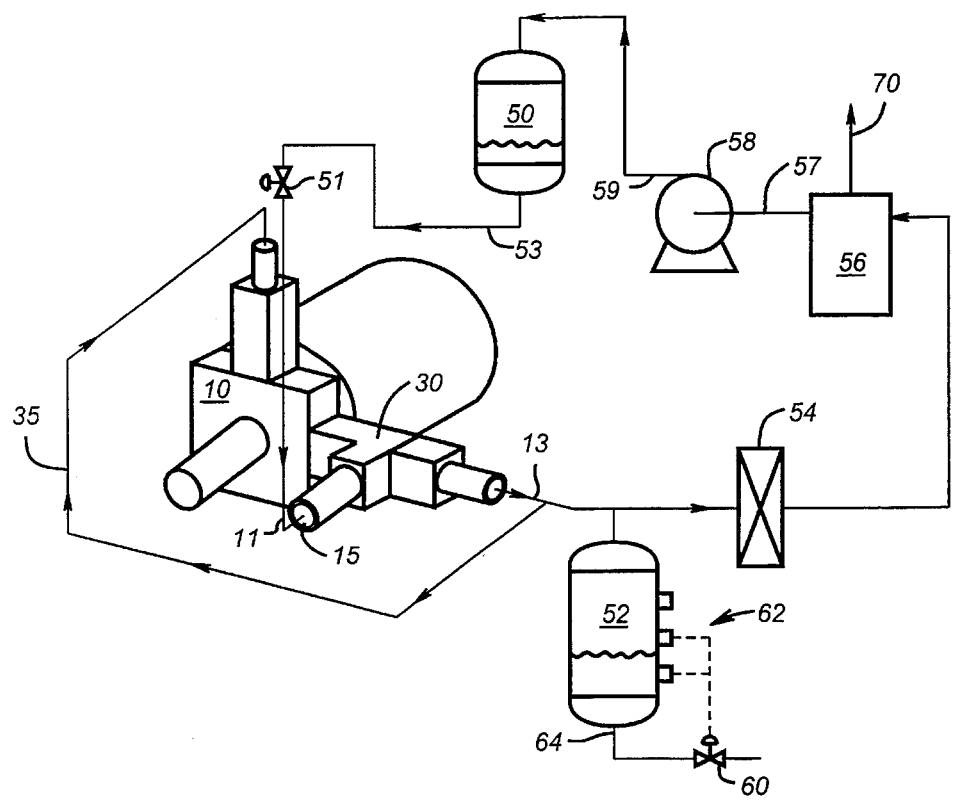
FIG. 5 is an isometric view of one embodiment of the present invention.

In a preferred embodiment, the present invention further comprises a vapor containment gland recirculation line 39, having a first end intersecting a fluid injection recirculation line 11, and a second end attached to the vapor inlet, as shown in FIG. 5. The vapor containment gland recirculation line provides a source of fluid to the vapor channel that can be sucked into the suction manifold.

The vapor containment device of the present invention further comprises a suction manifold 30 attached to the vapor containment gland. The suction manifold comprises a suction channel 32 in fluid communication with the vapor outlet of the vapor containment gland, as shown in FIG. 6. The suction manifold further comprises a fluid injection channel 34 having first end attachable to a fluid container 50 and a second end intersecting the suction channel, as shown in FIG. 5. In a preferred embodiment, the fluid injection channel intersects the suction channel at a substantially perpendicular angle. The suction manifold further comprises a suction nozzle bore 36 in alignment with the suction channel and extending to the outer periphery of the suction manifold.

Figure 4:
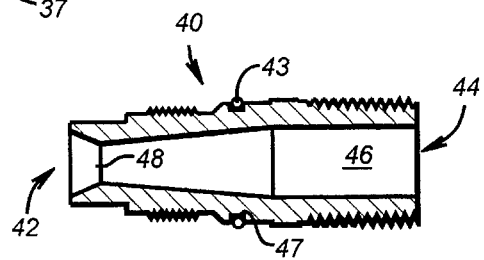
FIG. 4 is a cross-sectional view of the suction nozzle of the present invention.

The vapor containment device of the present invention further comprises a suction nozzle 40 comprising a suction end 42, a discharge end 44, a tapered flow region 48, and a flow channel 46 extending longitudinally through the suction nozzle, as shown in FIG. 4. The suction nozzle is adjustably insertable in the bore to extend into the intersection of the suction channel and the fluid injection channel such that the flow channel is in fluid communication with the suction channel and the fluid injection channel, as shown in FIG. 5. As shown in FIG. 4, when fluid flows into the suction end 42 through the tapered flow region 48, to the discharge end 44, of the suction nozzle 40, a venturi effect results. As shown in FIGS. 4 and 6, suction nozzle 40 is capable of producing a suction on the combination of fluids entering through fluid injection channel 34 and suction channel 32, regardless of the liquid/gas content of each fluid and independent of the spatial orientation of the suction manifold.

In a preferred embodiment, the bore of the suction manifold comprises female threads 37 and the suction nozzle comprises male threads 45 that threadably engage the female threads of the bore. In a preferred embodiment, an O-ring groove 47 extends circumferentially around the suction nozzle and an O-ring 43 is inserted in the O-ring groove.

The present invention further comprises a fluid injection recirculation line 11. The fluid injection recirculation line comprises a first end 13 attached to the discharge end of the suction nozzle and a second end 15 attached to the first end of the fluid injection channel, as shown in FIG. 5. As shown in FIG. 5, balance line 35 extends from the first end of the fluid injection recirculation line to the vapor inlet of the vapor containment gland.

In another aspect, the present invention is directed toward a vapor containment and recirculation system. This system of the present invention comprises a vapor containment gland, a suction manifold, a suction nozzle, and a fluid injection recirculation line, as discussed above. It further comprises a pressurized fluid delivery system comprising a container of pressurized fluid 50 connected to a discharge line 53 comprising a valve 51, as shown in FIG. 5. The discharge line is connected to the fluid injection channel such that the valve can be opened and closed to control the flow of pressurized fluid from the container into the fluid injection channel. In a preferred embodiment, the pressurized fluid is nitrogen, and it is injected at a constant pressure of at least 35 psig.

The system further comprises a liquid separator/collection tank 52 installed in the fluid injection recirculation line and capable of collecting liquid that may flow through the fluid injection recirculation line, as shown in FIG. 5. In an alternative embodiment, a chiller unit 52 is used instead of a liquid separator/collection tank, as shown in FIG. 5. The chiller unit is capable of condensing moisture entrained in the fluid that flows through the fluid injection recirculation line.

In a preferred embodiment, the invention further comprises level instrumentation 62 installed on the liquid collection tank. The level instrumentation is capable of emitting a high-level signal when the liquid level in the liquid collection tank reaches a predetermined level. The instrumentation is further capable of emitting a low-level signal when the liquid level in the liquid collection tank reaches a predetermined low level. In this embodiment, this invention further comprises a liquid discharge line 64 having a first end connected to the lower region of the liquid collection tank and having a second end attachable to a desired fluid receiving line. A motor operated valve 60 is installed in the fluid discharge line. The motor operated valve is electrically connected to the level instrumentation such that the valve opens in response to a high-level signal and closes in response to a low-level signal from the level instrumentation. The liquid discharge line can be connected to the suction of a pump on which the present invention is installed.

The system further comprises a filter 54 installed in the recirculation downstream from the liquid collection tank, as shown in FIG. 5. In a preferred embodiment, the filter is a carbon filter. In a preferred embodiment using the carbon filter, process instrumentation is employed on the upstream and downstream sides of the carbon filter to determine whether the filter is effectively adsorbing VOCs entrained in the fluid stream.

The system of the present invention further comprises an exhaust gas collection tank 56 installed in the fluid injection recirculation line downstream from the filter. In this embodiment, the invention functions as a vapor containment and emission recovery system. The exhaust gas collection tank can collect VOCs and other environmentally hazardous gases and store those gases for later controlled disposal or processing. An exhaust vent line 70 may be installed in the top of the exhaust gas collection tank. The exhaust vent line contains at least one motor operated valve to permit the selective venting of the exhaust gas collection tank. Such vented gas may be flared.

Another embodiment of the system of the present invention comprises a compressor 58 comprising a suction line 57 attached to the exhaust gas collection tank and a discharge line 59 attached to the container of pressurized fluid.

In another embodiment of the system of the present invention, several pumps comprising the vapor containment gland and suction manifold of the present invention may be installed in parallel. In this parallel arrangement, the fluid injection channel of each pump is in fluid communication with a fluid injection header and the suction nozzle discharge end of each pump is in fluid communication with a fluid injection recirculation line header. This multipump embodiment can also be used with the compressor embodiment described above, such that a parallel system of pumps discharge into a common exhaust collection tank and receive pressurized fluid from a compressor hooked up to a common fluid injection header.

The present invention may also be adapted for use in preventing vapor leakage from valve assemblies installed in a line. In this embodiment, the invention comprises at least one in-line valve assembly 72 comprising a valve 73 installed in a line 71 suitable for transporting fluid flow. The invention further comprises a vapor containment gland enclosing the valve. The vapor containment gland comprises a central bore extending longitudinally through said gland such that the line extends through the central bore and the valve is centrally located within the vapor containment gland. The vapor containment gland further comprises a vapor inlet, a vapor outlet, a vapor channel extending around the valve and connecting the vapor inlet and vapor outlet.

This embodiment of the invention further comprises a suction manifold attached to the vapor containment gland and comprising a suction channel in fluid communication with the vapor outlet, a fluid injection channel having a first end attachable to a fluid container and a second end intersecting the suction channel and a suction nozzle bore in alignment with the suction channel, said bore extending to the outer periphery of the suction manifold.

This embodiment of the invention further comprises a suction nozzle of the type described in the valve embodiment of this invention. In one embodiment of this invention, the suction manifold is attached to the vapor containment gland by an extension line 74. In another embodiment of this invention, the suction manifold is configured to receive extension lines from a multiplicity of vapor containment gland that encase in-line valve assemblies.

Many modifications and variations may be made in the embodiments described herein and depicted in the accompanying drawings without departing from the concept of the present invention. Accordingly, it is clearly understood that the embodiments described and illustrated herein are illustrative only and are not intended as a limitation upon the scope of the present invention.

What is claimed is:

1. A vapor containment device for use in fluid systems, comprising:

(a) a vapor containment gland comprising a front face, a rear face, a vapor inlet, a vapor outlet, and an arced vapor channel connecting said vapor inlet and vapor outlet such that fluid must flow along an arced or circular path in order to travel from said vapor inlet to said vapor outlet;

(b) a suction manifold attached to said vapor containment gland and comprising a suction channel in fluid communication with said vapor outlet, a fluid injection channel comprising a first end attachable to a fluid container and a second end intersecting said suction channel, and a suction nozzle bore in alignment with said suction channel, said bore extending to the outer periphery of said manifold;

(c) a suction nozzle comprising a suction end, a discharge end, and a flow channel extending longitudinally through said suction nozzle, said nozzle being adjustably insertable in said bore to extend into the intersection of said suction channel and said fluid injection channel, such that said flow channel is in fluid communication with said suction channel and said fluid injection channel said suction nozzle being capable of producing a suction on the combination of fluids entering from said fluid injection channel and said suction channel regardless of the liquid/gas content of each fluid; and (d) a fluid injection recirculation line comprising a first end attached to the discharge end of said suction nozzle and a second end attached to the first end of said fluid injection channel.

2. The device of claim 1, further comprising a liquid collection tank installed in said fluid injection recirculation line and capable of collecting liquid that may flow through said fluid injection recirculation line.

3. The device of claim 1, further comprising a container of pressurized fluid attached to the first end of said fluid injection channel.

4. The device of claim 3, wherein said pressurized fluid is nitrogen.

5. The device of claim 2, further comprising:

(a) a filter installed in said fluid injection recirculation line downstream from said liquid collection tank; and (b) an exhaust gas collection tank installed in said fluid injection recirculation line downstream from said filter.

6. The device of claim 5, further comprising a compressor comprising a suction line attached to said exhaust gas collection tank and a discharge line attached to said container of pressurized fluid.

7. The device of claim 1, further comprising a chiller unit installed in said fluid injection recirculation line.

8. The device of claim 1, wherein said vapor containment gland further comprises a cylindrical central bore extending from said front face to said rear face and capable of receiving a pump shaft.

9. The device of claim 8, wherein said vapor channel extends in an arced configuration in said front face around said central bore.

10. The device of claim 9, wherein said arced configuration is greater than 270 degrees and less than 360 degrees.

11. The device of claim 9, further comprising a circular groove in said front face surrounding said arced configuration.

12. The device of claim 8, wherein said vapor containment gland comprises a bolt channel extending from said front face to said rear face of said vapor containment gland near its outer periphery.

13. The device of claim 1, wherein the flow channel of said suction nozzle comprises a tapered region near the suction end of said suction nozzle such that a venturi effect results when fluid flows from the suction end to the discharge end of said suction nozzle, independent of the spatial orientation of said suction manifold.

14. The device of claim 1, further comprising a vapor containment gland recirculation line comprising a first end intersecting the fluid injection recirculation line and a second end attached to said vapor inlet.

15. A vapor containment and emission recovery system, comprising:

(a) a vapor containment gland comprising a front face, a rear face, a vapor inlet, a vapor outlet, and a vapor channel extending in an arced configuration in said front face and connecting said vapor inlet and vapor outlet;

(b) a suction manifold attached to said vapor containment gland and comprising a suction channel in fluid communication with said vapor outlet, a fluid injection channel having a first end attachable to a fluid container and a second end intersecting said suction channel, and a suction nozzle bore in alignment with said suction channel, said bore extending to the outer periphery of said manifold;

(c) a pressurized fluid delivery system comprising a container of pressurized fluid connected to a discharge line comprising a valve, said discharge line being connected to said fluid injection channel such that said valve can be opened and closed to control the flow of pressurized fluid from said container into said fluid injection channel;

(d) a suction nozzle comprising a suction end, a discharge end, and a flow channel extending longitudinally through said suction nozzle, said nozzle being adjustably insertable in said bore to extend into the intersection of said suction channel and said fluid injection channel, such that said flow channel is in fluid communication with said suction channel and said fluid injection channel;

(e) a fluid injection recirculation line having a first end attached to the discharge end of said suction nozzle and a second end attached to said fluid injection channel;

(f) a liquid collection tank installed in said fluid injection recirculation line and capable of collecting liquid that may flow through said recirculation line;

(g) a filter installed in said fluid injection recirculation line downstream from said liquid collection tank; and (h) an exhaust gas collection tank installed in said fluid injection recirculation line downstream from said filter.

16. The device of claim 15, wherein said arced configuration is greater than 270 degrees and less than 360 degrees.

17. The device of claim 15, wherein said vapor containment gland further comprises a cylindrical central bore extending from said front face to said rear face, capable of receiving a pump shaft and located within the arced configuration of said vapor channel.

18. The device of claim 15, wherein said vapor containment gland further comprises:

(a) at least two bolt channels extending through said vapor containment gland from said front face to said rear face, at opposite peripheral regions of said vapor containment gland;

(b) a circular groove in the front face of said vapor containment gland, surrounding said arced configuration, and capable of receiving an O-ring; and (c) a raised circular ridge in the front face of said vapor containment gland, surrounding said groove.

19. The device of claim 18, further comprising:

(a) a cylindrical pump shaft extending through said bore; and (b) a circular sealing member mounted on said shaft and positioned such that it is in contact with the front face of said vapor containment gland.

20. The device of claim 15, wherein said bore comprises female threads and said nozzle comprises male threads threadably engaging the female threads of said bore.

21. The device of claim 15, further comprising:

(a) level instrumentation on said liquid collection tank capable of emitting a high level signal when the liquid level in said liquid collection tank reaches a predetermined level and further capable of emitting a low level signal when the liquid level in said liquid collection tank reaches a predetermined low level;

(b) a liquid discharge line having a first end connected to the lower region of said liquid collection tank and having a second end attachable to a desired fluid receiving line; and (c) a motor operated valve installed in said fluid discharge line, said valve being electrically connected to said level instrumentation such that said valve opens in response to a high level signal and said valve closes in response to a low level signal from said level instrumentation.

22. A vapor containment device for use in preventing vapor leakage from pump assemblies comprising:
   (a) a vapor containment gland comprising a front face, a rear face, a central bore extending from said front face to said rear face, a vapor inlet, a vapor outlet, a vapor channel extending in an arced configuration in said front face, around said bore and connecting said vapor inlet and vapor outlet, a circular groove in said front face, surrounding said arced configuration, and a raised circular ridge in said front face, surrounding said groove;
   (b) a cylindrical pump shaft extending through said central bore;
   (c) a circular sealing member mounted on said shaft and positioned such that it is in contact with the rear face of said vapor containment gland;
   (d) a suction manifold attached to said vapor containment gland and comprising a suction channel in fluid communication with said vapor outlet, a fluid injection channel having a first end attachable to a fluid container and a second end intersecting said suction channel, and a suction nozzle bore in alignment with said suction channel, said bore extending to the outer periphery of said manifold;
   (e) a suction nozzle comprising a suction end, a discharge end, and a flow channel extending longitudinally through said suction nozzle, said nozzle being adjustably insertable in said bore to extend into the intersection of said suction channel and said fluid injection channel, such that said flow channel is in fluid communication with said suction channel and said fluid injection channel; and
   (f) a vapor containment gland recirculation line having a first end attached to the discharge end of such suction nozzle and a second end attached to said vapor inlet.

23. The device of claim 22, wherein said suction nozzle comprises:

(a) an O-ring groove extending circumferentially around said nozzle; and
   (b) an O-ring inserted in said groove.

24. A vapor containment device and valve assembly for use in preventing vapor leakage from valve assemblies comprising:
   (a) at least one in-line valve assembly comprising a valve installed in a line suitable for transporting fluid flow;
   (b) a vapor containment gland enclosing said valve, said gland comprising a central bore extending longitudinally through said gland, such that said line extends through said central bore and said valve is centrally located within said vapor containment gland, said gland further comprising a vapor inlet, a vapor outlet, a vapor channel extending around said valve and connecting said vapor inlet and vapor outlet;
   (c) a suction manifold attached to said vapor containment gland and comprising a suction channel in fluid communication with said vapor outlet, a fluid injection channel having a first end attachable to a fluid container and a second end intersecting said suction channel, and a suction nozzle bore in alignment with said suction channel, said bore extending to the outer periphery of said manifold; and
   (d) a suction nozzle comprising a suction end, a discharge end, and a flow channel extending longitudinally through said suction nozzle, said nozzle being adjustably insertable in said bore to extend into the intersection of said suction channel and said fluid injection channel, such that said flow channel is in fluid communication with said suction channel and said fluid injection channel.

25. The device of claim 24, wherein said suction manifold is attached to said vapor containment gland by an extension line.

26. The device of claim 25, wherein said suction manifold configured to receive extension lines from a multiplicity of vapor containment glands.

* * * * *